(12) United States Patent
Maclay et al.

(10) Patent No.: US 10,829,217 B2
(45) Date of Patent: Nov. 10, 2020

(54) LIGHT-LIMITING HEADER ASSEMBLY FOR A TRANSITION AREA WITHIN AN INTERIOR CABIN OF AN AIRCRAFT

(71) Applicant: THE BOEING COMPANY, Chicago, IL (US)

(72) Inventors: William H. Maclay, Seattle, WA (US); Kevan Withers, Mukilteo, WA (US); Peter J. Zarkowskyj, Lynwood, WA (US); Charles C. Jensen, Marysville, WA (US); Mark E. Wentland, Lynnwood, WA (US); Alexandru Iaszfalvi, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 622 days.

(21) Appl. No.: 14/835,850

(22) Filed: Aug. 26, 2015

(65) Prior Publication Data

US 2016/0167786 A1 Jun. 16, 2016

Related U.S. Application Data

(60) Provisional application No. 62/090,912, filed on Dec. 12, 2014.

(51) Int. Cl.
*B64D 11/00* (2006.01)

(52) U.S. Cl.
CPC .................. *B64D 11/0023* (2013.01)

(58) Field of Classification Search
CPC ..................... B64D 11/0023; B64D 11/00
See application file for complete search history.

(56) References Cited

U.S. PATENT DOCUMENTS

| | | | | |
|---|---|---|---|---|
| 2,710,731 A * | 6/1955 | Bright | ............... | B64D 11/0023 105/323 |
| 4,185,799 A * | 1/1980 | Richards, Jr. | ...... | B64D 11/0023 244/118.5 |
| 5,082,224 A * | 1/1992 | Hayward | ........... | B64D 11/0023 160/135 |
| 5,086,540 A * | 2/1992 | Schumacher | ...... | B64D 11/0023 16/87.4 R |
| 5,165,626 A * | 11/1992 | Ringger | ............. | B64D 11/0023 16/282 |
| 6,523,779 B1 * | 2/2003 | Michel | ............... | B64D 11/0023 244/118.5 |
| 7,757,419 B2 * | 7/2010 | Horst | ................. | B64D 11/0023 248/317 |

(Continued)

FOREIGN PATENT DOCUMENTS

WO  WO 2009036738 A2 *  3/2009  ......... B64D 11/0023

*Primary Examiner* — Richard R. Green
(74) *Attorney, Agent, or Firm* — The Small Patent Law Group LLC; Joseph M. Butscher

(57) ABSTRACT

A header assembly is configured to be secured between an inboard structure and an outboard structure within an internal cabin of an aircraft. The header assembly includes a main body including a first panel connected to an opposed second panel by a base panel. The main body is configured to limit light from passing therethrough. At least three separate and distinct anchoring members are configured to securely connect the main body to at least three separate and distinct reciprocal structures of the inboard and outboard structures.

20 Claims, 12 Drawing Sheets

(56) References Cited

U.S. PATENT DOCUMENTS

| | | | | |
|---|---|---|---|---|
| 8,550,143 | B2* | 10/2013 | Breuer | B60R 11/00 160/127 |
| 2009/0230245 | A1* | 9/2009 | Mosler | B64D 11/0023 244/118.5 |
| 2009/0242150 | A1* | 10/2009 | Mosler | B64D 11/0023 160/368.1 |
| 2009/0321574 | A1* | 12/2009 | Erickson | B64D 11/0023 244/131 |
| 2011/0042434 | A1* | 2/2011 | Warner | B64D 11/0023 224/401 |
| 2012/0043028 | A1* | 2/2012 | Roach | B64D 11/0023 160/84.06 |
| 2012/0234976 | A1* | 9/2012 | Neumann | B61D 17/048 244/131 |
| 2012/0273613 | A1* | 11/2012 | Ulbrich-Gasparevic | B64D 11/0023 244/118.1 |
| 2015/0053838 | A1* | 2/2015 | Mazidi | B64D 11/0023 248/503 |
| 2017/0043855 | A1* | 2/2017 | Malek | B64D 11/0023 |

* cited by examiner

LIGHT-LIMITING HEADER ASSEMBLY FOR A TRANSITION AREA WITHIN AN INTERIOR CABIN OF AN AIRCRAFT

RELATED APPLICATIONS

This application relates to and claims priority benefits from U.S. Provisional Patent Application No. 62/090,912 entitled "Light-Blocking Header Assembly for a Transition Area Within an Interior Cabin of an Aircraft," filed Dec. 12, 2014, which is hereby incorporated by reference in its entirety.

BACKGROUND OF THE DISCLOSURE

Embodiments of the present disclosure generally relate to light-limiting header assemblies configured to be secured above and/or to curtains within an interior cabin of an aircraft.

Commercial aircraft typically include an interior cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

Each passenger section may be separated from an adjacent passenger section by a cabin transition area, which may include one or more monuments, such as walls, work stations, or the like. Curtains may be used to separate sections of an aircraft for a variety of reasons, including class separation, privacy, work areas, and the like. For example, a cabin transition area between a business class section and a coach section may include a curtain assembly within an aisle. A curtain moveably connected to a curtain track that spans over any aisle may be selectively opened and closed. When opened, such as during a boarding process, passengers may pass from one section to another section, such as from the business class section to the coach section. During flight, the curtain may be closed to indicate that passengers are not allowed to pass (or at least discouraged from passing) from the coach section into the business class section.

During flights, lights within one passenger section may be on, while lights within an adjacent passenger section may be off. Some aircraft include a header over a curtain section that is configured to limit or shade light between sections. One known header is formed of a fabric. However, many fabric headers are flimsy, porous, and do not interface well with mating structure, thereby allowing a substantial amount of light to pass therethrough. Further, many fabric headers are unsightly, and susceptible to being deformed during flight.

Another known header is a linear panel formed of a solid material. The solid header typically straddles onto an upper curtain track of the curtain in a linear fashion. For example, the solid header may straddle either side of a curtain track and be secured thereto. However, many known solid headers are incapable of withstanding various internal forces exerted upon or within the headers during flight (such as during extreme or emergency maneuvering), which may cause the headers to dislodge or otherwise fall.

Accordingly, a need exists for an effective and robust header assembly that is configured to be used within an interior cabin of an aircraft.

SUMMARY OF THE DISCLOSURE

Certain embodiments of the present disclosure provide a header assembly configured to be secured between an inboard structure and an outboard structure within an internal cabin of an aircraft. The header assembly may include a main body including a first panel connected to an opposed second panel by a base panel. The main body is configured to limit light from passing therethrough. At least three anchoring members are configured to securely connect the main body to at least three reciprocal structures of the inboard and outboard structures. The anchoring members and reciprocal structures cooperate to secure the header assembly to the inboard and outboard structures. The anchoring pattern may form a triangle or tripod, which may reside in a single horizontal plane, for example. The anchoring members may be configured to cooperate to accommodate imprecise positioning and/or shifting locations of reciprocal structures to which the header assembly secures.

In at least one embodiment, the main body includes an inboard end configured to connect to the inboard structure and an outboard end configured to connect to the outboard structure. The at least three anchoring members may include first and second anchoring members proximate to the outboard end and a third anchoring member proximate to the inboard end.

The base panel may include a track channel configured to receive and retain a curtain track that slidably retains portions of a curtain, such as moveable curtain rungs. The track may be oriented in various different pathways to accommodate passenger positioning within a cabin.

The main body may be formed of a solid, non-porous composite material. In at least one embodiment, the main body may be formed of a composite honeycomb core panel positioned between covering skins. A space may be formed between the first and second panels. At least one seal may be secured within the space between the first and second panels. The seal(s) is configured to sealingly connect (for example, provides a sealing interface) to an internal surface of the internal cabin of the aircraft.

One or both of the first and second panels may include a non-planar, outwardly-curved surface. Alternatively, one or both of the first and second panels may include a flat planar surface. In at least one embodiment, the main body may be symmetrical about a central longitudinal plane.

The header assembly may include an extension beam secured to the main body. The anchoring members may be secured to the extension beam.

The anchoring members may include an inboard support fitting, a first outboard support fitting, and a second outboard support fitting. In at least one embodiment, the inboard support fitting includes a grommet having and/or retained by a bracket that includes an internal channel that is configured to receive and retain a bayonet of a connection fastener extending from the inboard structure. Each of the first and second outboard support fittings may include one of a structure that is configured to be latchably engaged or a latch that is configured to latchably engage the structure.

The main body may be configured to be moved between a secured position between the inboard and outboard structures and a pivoted position in which the main body is pivotally secured to one of the inboard or outboard structures and disconnected from the other of the inboard or outboard structures. In the pivoted position, portions of a ceiling of the internal cabin (and features above the ceiling) may be accessed for service and maintenance.

Certain embodiments of the present disclosure provide an aircraft assembly that may include a fuselage defining an internal cabin, an inboard structure and an outboard structure separated by an aisle within the internal cabin, and a header assembly secured between the inboard structure and the outboard structure. The header assembly is positioned above a moveable curtain assembly. The header assembly may include a main body formed of a solid, non-porous composite material. The main body may include a first panel connected to an opposed second panel by a base panel. The main body is configured to limit light from passing therethrough. One or more seals may be coupled to the header assembly, adjacent structures, or both. At least three anchoring members are configured to securely connect the main body to at least three reciprocal structures of the inboard and outboard structures.

DETAILED DESCRIPTION OF THE DISCLOSURE

Figure 1:
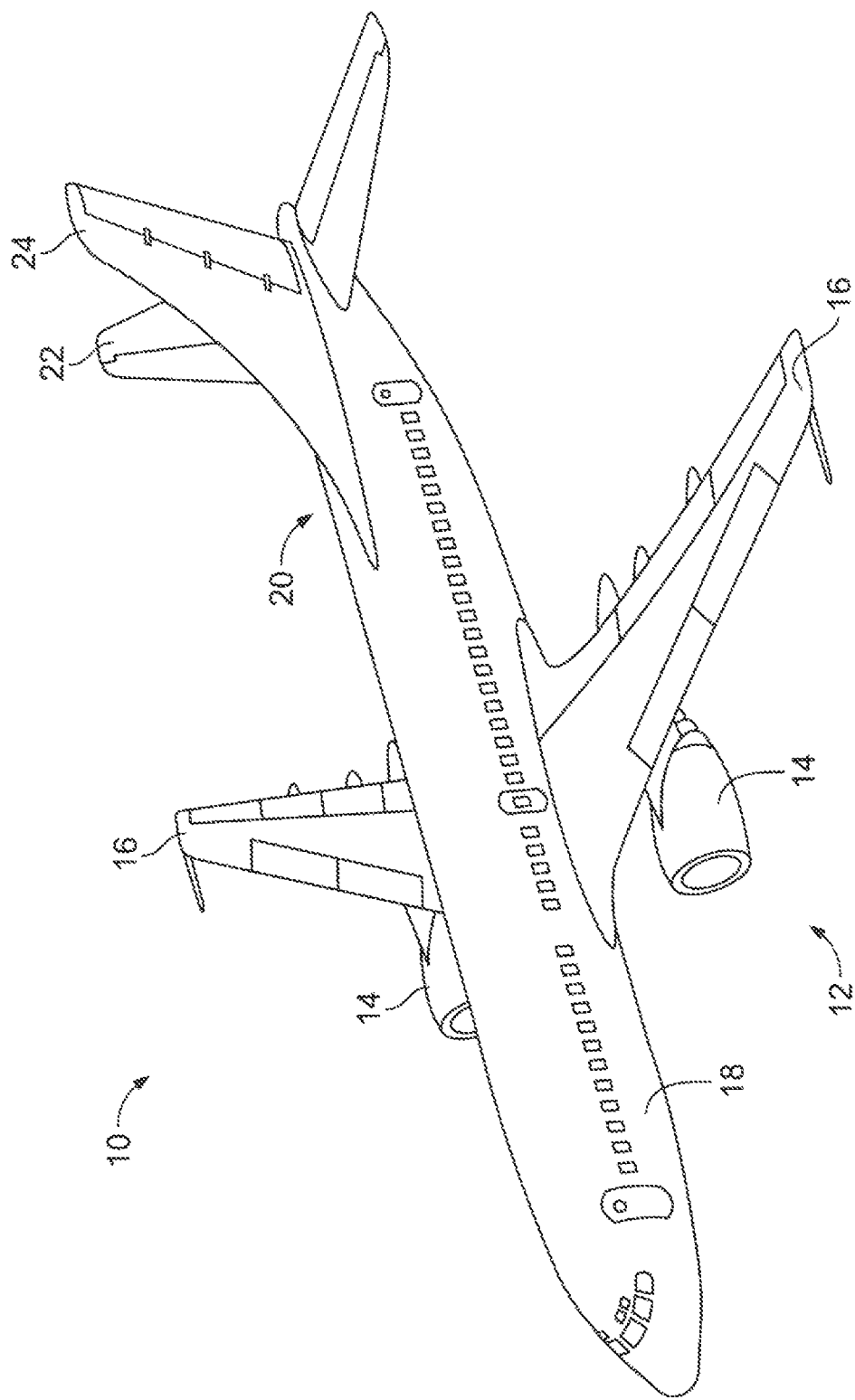
FIG. 1 is a diagrammatic representation of a perspective top view of an aircraft, according to an embodiment of the present disclosure.

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide light-blocking header assemblies for a transition area within an interior cabin of an aircraft. The term "light-blocking" does not necessarily mean that any and all light is impeded. For example, small beams of light may pass through small pinholes, seams, or the like. In this manner, the term light-blocking includes light-limiting.

Embodiments of the present disclosure provide header assemblies that are configured to block or otherwise limit passage of light over curtain assemblies within an interior cabin of an aircraft. The header assemblies are sturdy, robust, and aesthetically agreeable in that they may contour and blend with inboard or outboard structures (such as through smooth, arcuate transitions).

Embodiments of the present disclosure provide a header assembly that may be formed of a solid, non-porous material, such as a composite material. The header assembly may include first and second opposed panels, such as a front (or forward) panel and a rear (or aft) panel, connected to a base panel, and one or more sealing members that are configured to sealingly engage internal surfaces of a cabin of an aircraft, such as a ceiling, bin frame, monument, and the like. The header assembly may also include opposed first and second ends. The distance from the front panel to the rear panel may be greater at the first end than at the second end, or vice versa. One or both of the front and rear panels may be non-planar. For example, one or both of front and rear panels may include a smooth arcuate surface. A curtain track may be disposed between the first and second ends. The curtain track may terminate at each end at any location between the front and rear panels. The first or second end may include two structural attachments, while the other of the first or second end may include a single structural attachment. The front and rear panels may define an internal space or void therebetween. The space or void may be configured to receive an aircraft sub-system, such as lighting, speakers, or the like.

Embodiments of the present disclosure provide header assemblies that may be configured to accommodate fixture offsets, while remaining in a non-angled orientation. Each header assembly is configured to block or otherwise limit transmission of light from passing therethrough. For example, each header assembly may be formed of an opaque, non-porous material. Each header assembly is robust and resilient so as to resist internal forces within a cabin of an aircraft during operation. Embodiments of the present disclosure provide header assemblies that may include outer curved surfaces that are aesthetically agreeable and configured to smoothly interface with adjacent cabin features.

FIG. 1 is a diagrammatic representation of a perspective top view of an aircraft 10 (or aircraft assembly), according to an embodiment of the present disclosure. The aircraft 10 may include a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personal carry-on baggage areas, and the like), and one or more passenger sections (for example, first class, business class, and coach sections). Each of the sections may be separated by a cabin transition area, which may include a curtain assembly having a moveable curtain that may be selectively opened and closed within an aisle.

Figure 2:
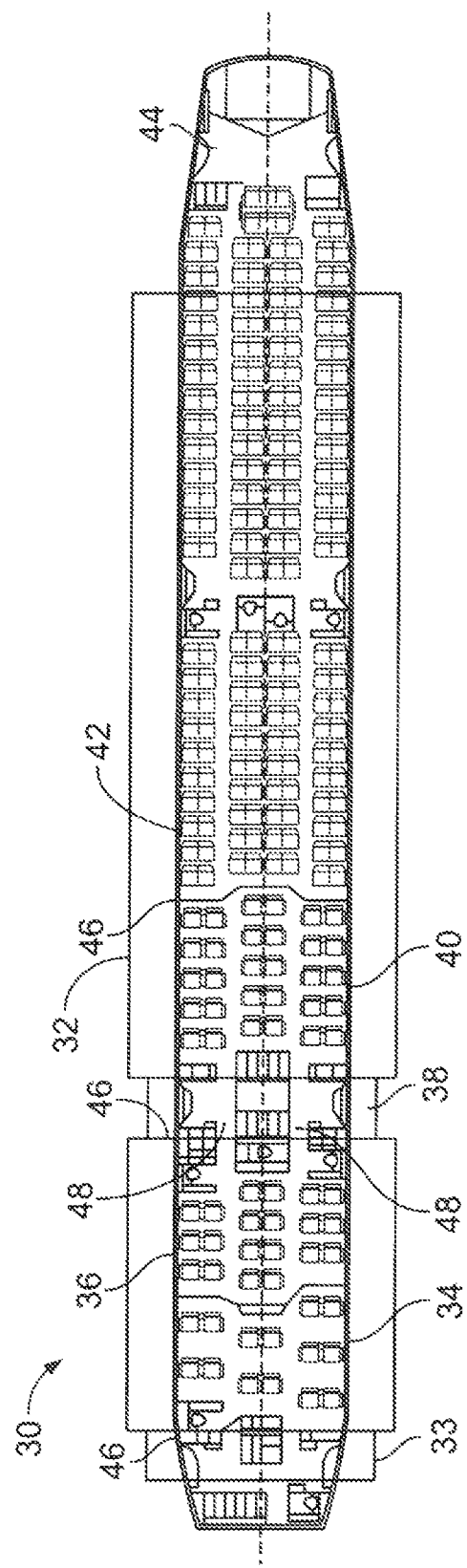
FIG. 2 is a diagrammatic representation of a top plan view of an internal cabin of an aircraft, according to an embodiment of the present disclosure.

FIG. 2 is a diagrammatic representation of a top plan view of an internal cabin 30 of an aircraft, according to an embodiment of the present disclosure. The internal cabin 30 may be within a fuselage 32 of the aircraft. The internal cabin 30 includes multiple sections, including a front light ring section 33, a first class section 34, a business class section 36, a front galley section 38, an expanded economy or coach section 40, a standard economy of coach section 42, and a rear galley section 44. While not shown, the internal cabin 30 may include additional sections, such as other galley sections. It is to be understood that the internal cabin 30 may include more or less sections than shown. For example, the internal cabin 30 may not include a first class section, and may include more or less galley sections than shown. Each of the sections may be separated by a cabin transition area 46, which may include curtain assemblies between structural features (such as monuments, overhead bins, or the like) within aisles 48.

Figure 3:
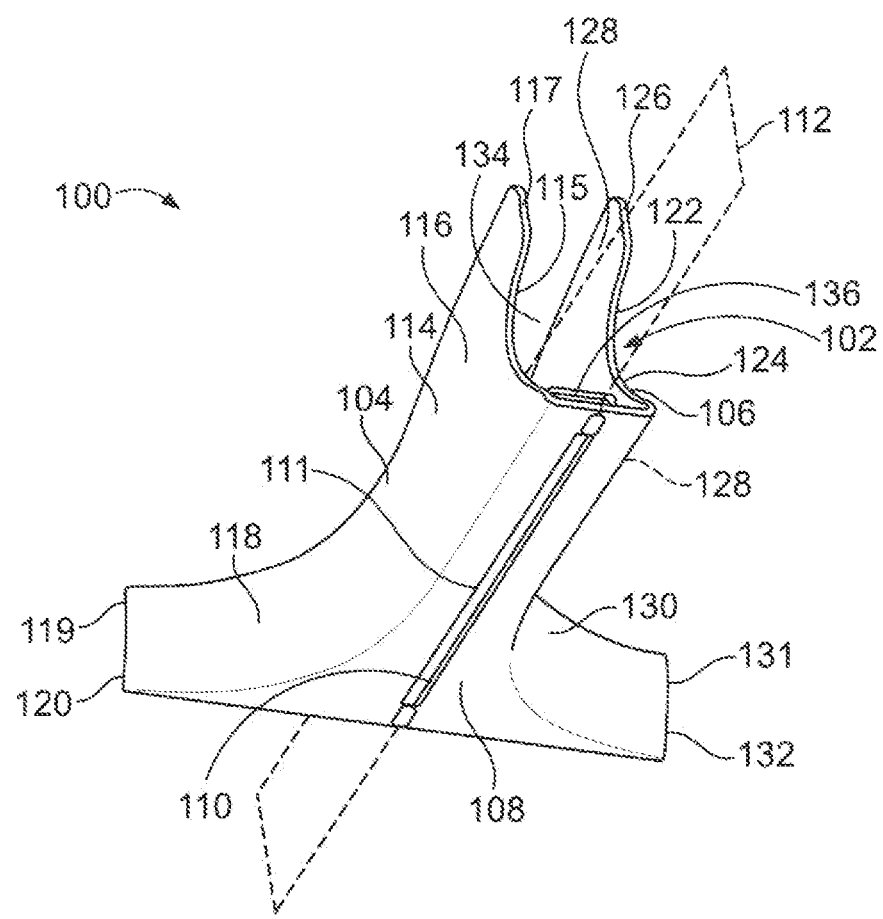
FIG. 3 is a diagrammatic representation of a perspective bottom view of a header assembly, according to an embodiment of the present disclosure.

FIG. 3 is a diagrammatic representation of a perspective bottom view of a header assembly 100, according to an embodiment of the present disclosure. The header assembly 100 may include a main body 102 that includes a first panel 104, such as a forward or front panel, connected to an opposed second panel 106, such as an aft or rear panel, which are both connected to a base panel 108. The first and second panels 104 and 106 may generally be perpendicular to the base panel 108. For example, the first and second panels 104 and 106 may be oriented with respect to, and reside in at least one plane that is parallel to, a Y-Z plane (for example, vertically oriented), while the base panel 108 may be oriented with respect to, and reside in at least one plane that is parallel to, an X-Y plane (for example, horizontally oriented). A curtain track 110 is secured to and/or through a bottom surface of the base panel 108. For example, the curtain track 110 may be secured within a track channel 111 formed in the base panel 108. As shown, the header assembly 100 may be symmetrical about a central longitudinal plane 112 that bisects the header assembly 100.

The first panel 104 may include an upstanding wall 114 that upwardly extends from the base panel 108. The upstanding wall 114 may include an arcuately-formed recess, such as a divot 115 at a first end 117, such as an inboard end. The divot 115 may be sized, shaped, and configured to conform and contour to an outer surface of a portion of a structure within an internal cabin of an aircraft, such as a monument (for example, a central partitioning wall, barrier, galley, lavatory wall, stowage bin, or the like). The upstanding wall 114 includes a main aisle-spanning segment 116 that may generally be aligned with the longitudinal plane 112. The main aisle-spanning segment 116 may be configured to extend over an aisle within an internal cabin of an aircraft. The main aisle-spanning segment 116 connects to an outwardly-curved securing segment 118 at a second end 119 that opposes the first end 117. The outwardly-curved securing segment 118 is configured to connect to an outboard structure within the internal cabin, such as an upper frame of an overhead storage bin. The outwardly-curved securing segment 118 may connect to a terminal edge 120, which may reside in a plane that is perpendicular to the central longitudinal plane 112.

Similarly, the second panel 106, which is generally opposed to the first panel 104 and may be a mirror image thereof, may include an upstanding wall 122 that upwardly extends from the base panel 108. The upstanding wall 122 may include an arcuately-formed recess, such as a divot 124 at a first end 126, such as an inboard end. The divot 124 may be sized, shaped, and configured to conform to an outer surface of a portion of a structure within an internal cabin of an aircraft, such as a monument (for example, a central wall, barrier, galley, stowage bin, or the like). The upstanding wall 122 includes a main aisle-spanning segment 128 that may generally be aligned with the longitudinal plane 112. The main aisle-spanning segment 128 connects to an outwardly-curved securing segment 130 at a second end 131 that opposes the first end 126. The outwardly-curved securing segment 130 is configured to connect to an outboard structure within the internal cabin, such as an upper frame of an overhead storage bin. The outwardly-curved securing segment 130 may connect to a terminal edge 132, which may reside in a plane that is perpendicular to the central longitudinal plane 112.

An internal space or void 134 is defined between interior surfaces of the first and second panels 104 and 106 and the base panel 108. The internal space 134 may be configured to retain an aircraft sub-system, such as speakers, lights, or the like, therein. The internal space 134 may also be configured to receive seals attached to adjacent structures, such as a ceiling, galley, stowage bin, or the like. An extension beam 136 is secured to an upper surface of the base panel 108 within the internal space 134. The extension beam 136 may be aligned about the central longitudinal plane 112. For example, the extension beam 136 may be bisected by the central longitudinal plane 112

The first and second panels 104 and 106 and the base panel 108 may be formed of a solid, opaque material. For example, the panels 104, 106, and 108 may be formed of a composite material, such as fiberglass, that blocks, prevents, or otherwise limits light from passing therethrough. In at least one embodiment, the panels 104, 106, and 108 may be formed from fiberglass sheets that sandwich a honeycomb structural core through a crush core process. In general, the panels 104, 106, and 108 may be formed of the same or similar material as internal walls, ceilings, and the like within an internal cabin of an aircraft.

As shown, the header assembly 100 may be symmetrical about the central longitudinal plane 112. Alternatively, the header assembly 100 may be asymmetrical about the central longitudinal plane 112. In at least one embodiment, the curvature of the outwardly-curved securing segment 118 may differ from the curvature of the outwardly-curved securing segment 130. The outwardly-curved securing segments 118 and 130 are sized, shaped, and configured to provide a smooth, blending, aesthetically-pleasing connection to an outboard structure within an internal cabin of an aircraft. Alternatively, one or both of the first and second panels 104 and 106 may not include an outwardly-curved securing segment, but may instead be configured to couple (such as by interfacing, fitting up, or connecting) to an outboard structure within an internal cabin of an aircraft, for example, at a right angle.

Figure 4:
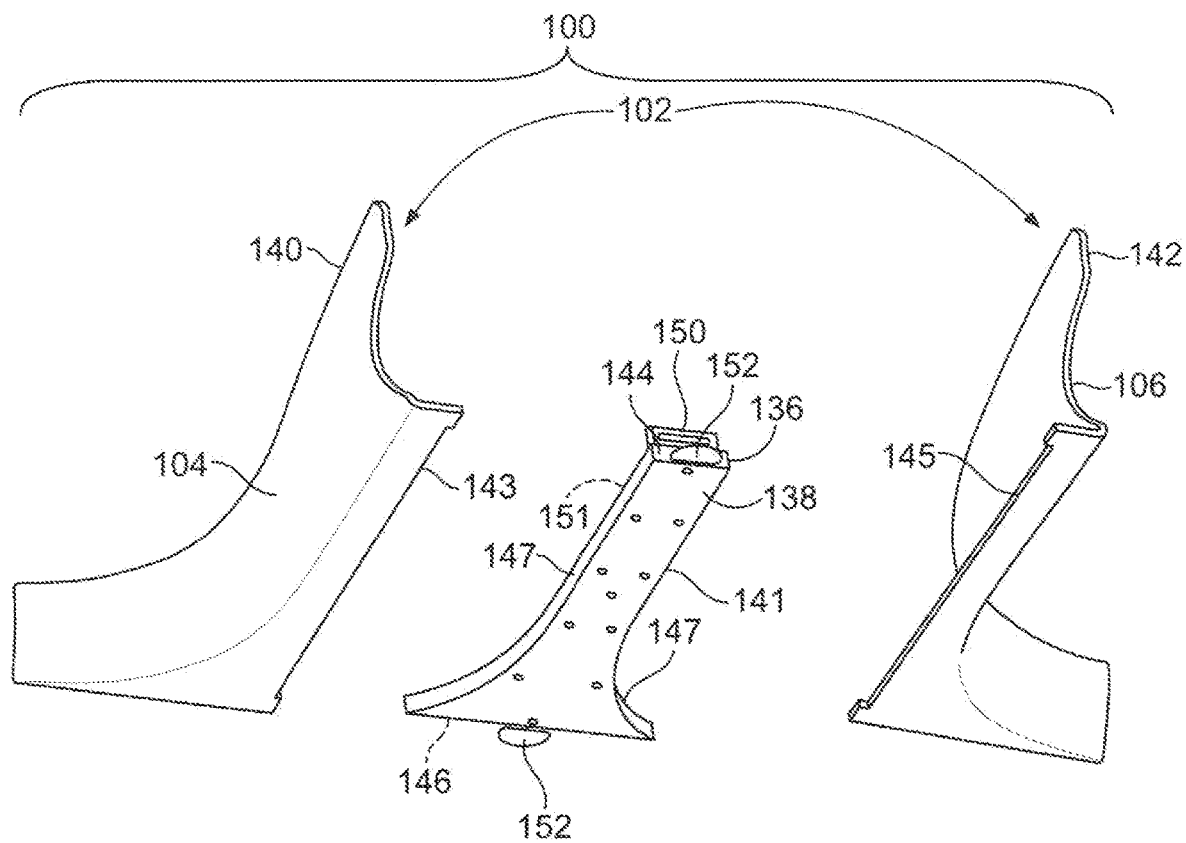
FIG. 4 is a diagrammatic representation of a perspective bottom exploded view of a header assembly, according to an embodiment of the present disclosure.

FIG. 4 is a diagrammatic representation of a perspective bottom exploded view of the header assembly 100, according to an embodiment of the present disclosure. As shown, the main body 102 may be formed from separate and distinct first and second portions 140 and 142. Opposed channels 143 and 145 may be formed through bottom portions of the first and second portions 140 and 142. When the first and second portions 140 and 142 are connected together, the opposed channels 143 and 145 form a curtain track channel (or track channel) that may be configured to retain the curtain track 110 (shown in FIG. 3). Alternatively, the main body 102 may be integrally molded and formed as a single piece.

Optionally, the curtain track 110 may be secured to the base 138 and the track support plates 152. The opposed channels 143 and 145 of the first and second portions 140 and 142, respectively, allow the curtain track 110 to sit flush with the bottom of the main body 102. The curtain track 110 may also be secured proud of the main body 102.

The extension beam 136 includes a base 138 having a bottom surface 141 connected to opposed lateral edges 147, an inboard edge 144, and an outboard edge 146. The lateral edges 147 may be sized and shaped to conform to internal surfaces of the first and second panels 104 and 106. For example, the lateral edges 147 may abut into the internal surfaces of the first and second panels 104 and 106. Alternatively, the lateral edges 147 may not abut into the internal surfaces of the first and second panels 104 and 106.

The extension beam 136 may secure to the bottom surface 141 through an interference fit, bonding, and/or one or more fasteners that extend through the bottom surface 141. A first anchoring member, such as an inboard support fitting 150 (for example, a grommet) may extend from an upper surface 151 of the extension beam 136. Curtain track support plates 152 may outwardly extend from the inboard edge 144 and the outboard edge 146. The curtain track support plates 152 are configured to securely connect to terminal ends of the curtain track 110 (shown in FIG. 3), such as through one or more fasteners. For example, bolts may extend through a channel formed through each curtain track support plate 152, and connect to reciprocal retaining portions formed through terminal ends of the curtain track 110.

Figure 5:
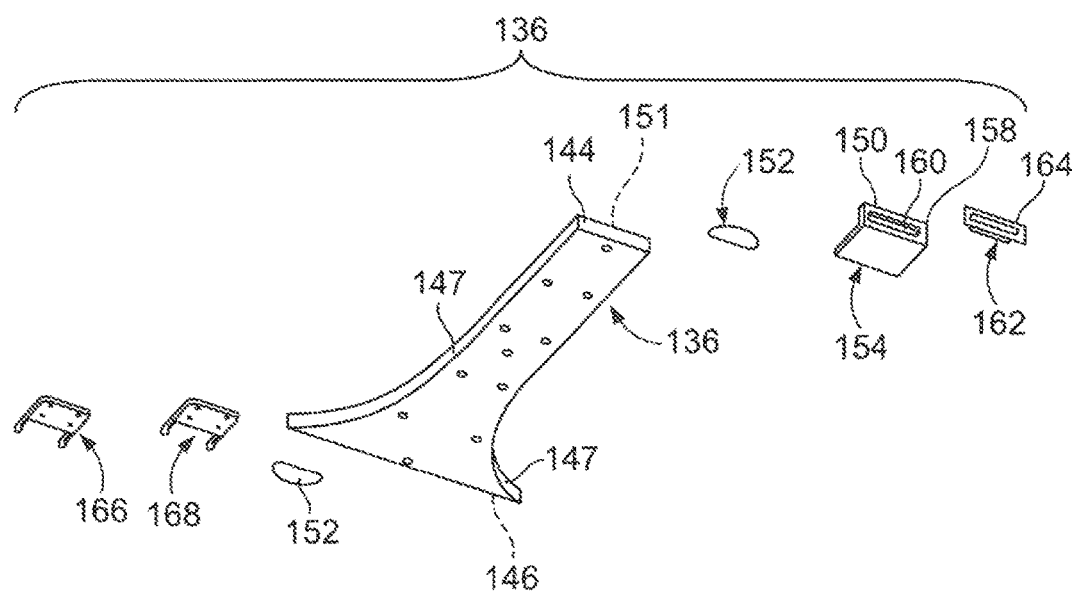
FIG. 5 is a diagrammatic representation of a perspective bottom exploded view of an extension beam, according to an embodiment of the present disclosure.

FIG. 5 is a diagrammatic representation of a perspective bottom exploded view of the extension beam 136, according to an embodiment of the present disclosure. The inboard support fitting 150 (the first anchoring member) may provide a grommet that includes a flat securing base 154 that is secured to the upper surface 151 of the extension beam 136. A bracket 158 extends upwardly from the securing base 154, such as at a right angle. The bracket 158 defines an internal channel 160. An insert 162 may be configured to be secured within the internal channel 160. The insert 162 (which may be configured to minimize or otherwise reduce rattling of a reciprocal connecting bayonet) includes a fastener channel 164 configured to receive an inboard fastener, as described below.

Second and third anchoring members, such as outboard support fittings 166 and 168, secure to the upper surface 151 proximate to the outboard edge 146. The outboard support fitting 166 secured to the upper surface 151 proximate to one of the lateral edges 147, while the outboard support fitting 168 is secured to the upper surface 151 proximate to the opposite lateral edge 147. The outboard support fittings 166 and 168 are configured to removably secure to reciprocal structures connected to an outboard structure within an internal cabin of an aircraft. The outboard support fittings 166 and 168 may include one or more latchable members, such as rods, bars, posts, studs, or the like, that are configured to be latchably engaged by a latch secured to an outboard structure. Alternatively, the outboard support fittings may be latches, while the latchable members connect to the outboard structure.

The inboard support fitting 150 provides a first attachment area or anchoring member that is configured to securely connect to a reciprocal inboard structure (for example, the inboard support fitting 150 may receive and retain an inboard fastener, bayonet fitting, or the like), while the outboard support fittings 166 and 168 provide second and third attachment areas or anchoring members that are configured to securely connect to reciprocal outboard structures. As such, the extension beam 136 provides three points of anchoring attachment that securely and safely secure the header assembly 100 (shown in FIGS. 3 and 4) within an internal cabin of an aircraft. The three points of attachment provide a triangular securing configuration within a securing plane.

The triangular attachment pattern may be formed by the inboard support fitting 150 at the inboard end (such as at and/or proximate to the inboard edge 144) of the extension beam 136, and the two outboard support fittings 166, 168 at the outboard end (such as at and/or proximate to the outboard edge 146) of the extension beam 136. A first linear segment defined by a straight-line distance between the inboard support fitting 150 and the outboard support fitting 166 forms an angle with a second linear segment defined by a straight-line distance between the inboard support fitting 150 and the outboard support fitting 168. A straight line distance between the outboard support fittings 166 and 168 at the outboard end completes the triangle. The triangle may be disposed within a plane that is parallel to a plane in which the upper surface 151 of the extension beam 136 resides.

Figure 6:
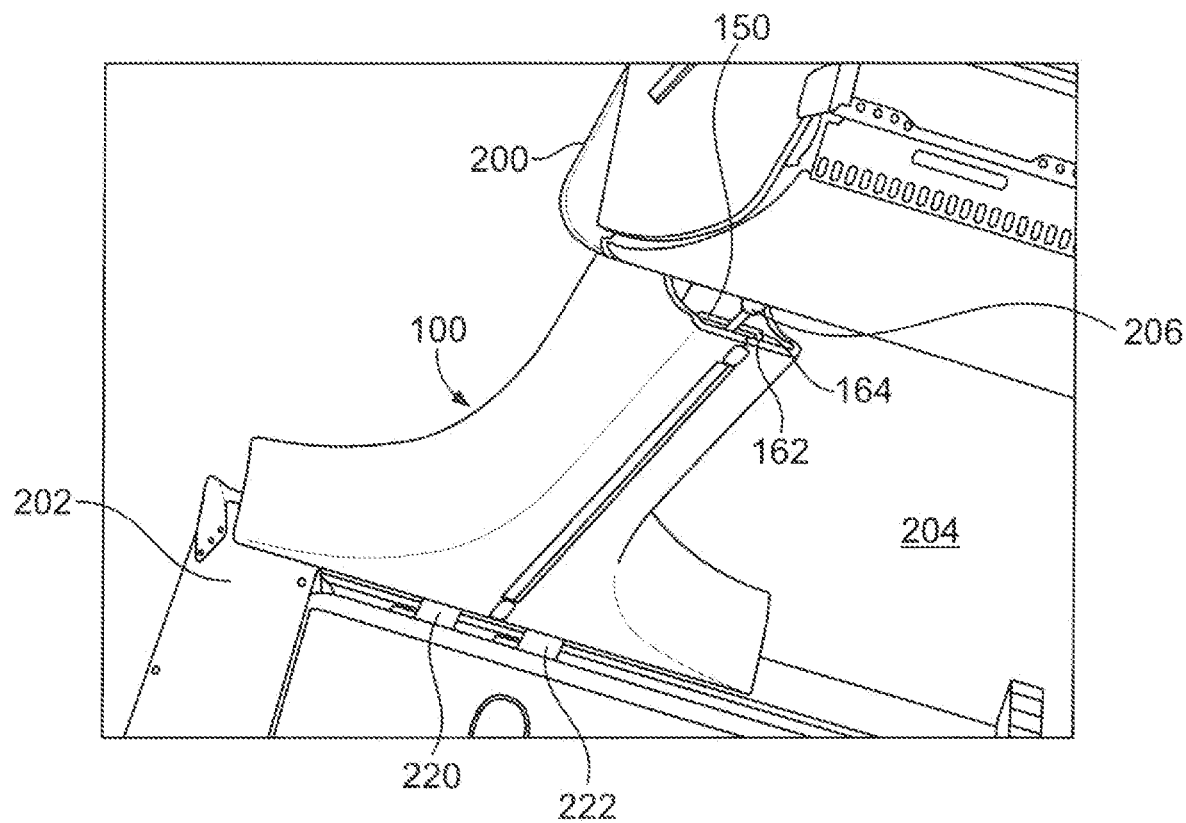
FIG. 6 is a diagrammatic representation of a perspective bottom view of a header assembly secured between an inboard structure and an outboard structure within an internal cabin of an aircraft, according to an embodiment of the present disclosure.

FIG. 6 is a diagrammatic representation of a perspective bottom view of the header assembly 100 secured between an inboard structure 200 and an outboard structure 202 within an internal cabin 204 of an aircraft, according to an embodiment of the present disclosure. The inboard structure 200 may be or include a fixed frame of an inboard overhead storage bin. The outboard structure 202 may be or include a fixed frame of an outboard overhead storage bin.

A connection fastener 206 (such as a securing protuberance, which may or may not be spring-biased) extends from a portion of the inboard structure 200 and is securely retained within the fastener channel 164 of the insert 162 of the inboard support fitting 150. Latches (such as the latching protuberances 224 and 226 shown in FIG. 7) coupled to beams 220 and 222 of the outboard structure 202 latchably mate with the outboard support fittings 166 and 168, respectively (shown in FIG. 5). Alternatively, the latches may be on the extension beam 136, while latchable members extend from the outboard structure 202. As such, the header assembly 100 is securely braced between the inboard structure 200 and the outboard structure 202 at three anchoring locations, namely two anchoring locations on the outboard end (for example, the latches latchably mating with the outboard support fittings 166 and 168, respectively), and one anchoring location on the inboard end (for example, the connection fastener 206 mating with the insert 162 of the inboard support fitting 150).

As used herein, the term "outboard" means a position that is further away from a central vertically-oriented longitudinal plane of a fuselage of an aircraft than another component. The term "inboard" means a position that is closer to the central vertically-oriented longitudinal plane of the fuselage of the aircraft than another component. Thus, an overhead bin connected to an interior wall defining windows of an internal cabin is outboard in relation to an overhead bin that is connected to a central ceiling portion of the internal cabin (which is inboard in relation to the overhead bin connected to the interior wall).

Figure 7:
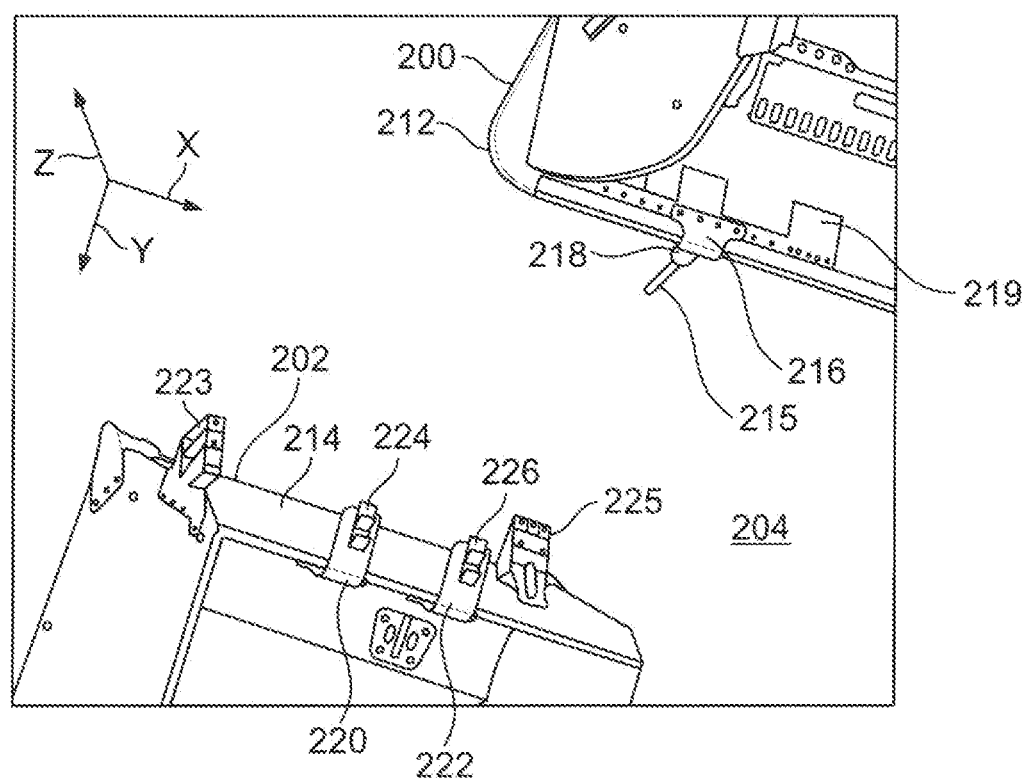
FIG. 7 is a diagrammatic representation of a perspective bottom view of an inboard structure and an outboard structure within an internal cabin of an aircraft, according to an embodiment of the present disclosure.

FIG. 7 is a diagrammatic representation of a perspective bottom view of the inboard structure 200 and the outboard structure 202 within the internal cabin 204 of an aircraft, according to an embodiment of the present disclosure. For the sake of clarity, the header assembly 100 is not shown in FIG. 7. As noted, the inboard and outboard structures 200 and 202 may be overhead storage bins, which may include fixed bin frames 212 and 214 that operatively connect to pivotal or slidable bin buckets (not shown in FIG. 7).

The connection fastener 206 may include a bayonet 215 (such as a post, cylinder, pin, stud, or the like) that secures to a pin bracket 216 through a pivot pin 218. The pin bracket 216 secures to the inboard structure 200, such as through a reinforcing bracket 219. Latches, such as the latching protuberances 224 and 226, extend from ends of the beams 220 and 222, which are distally located from securing areas where the beams 220 and 222 securely mount to the outboard structure 202. The latching protuberance 224 may be fixed in position with respect to all three X, Y, and Z axes. The latching protuberance 226 may be fixed in position with respect to two of the three axes, such as the X and Z axes. Alternatively, the latching protuberance 224 may be fixed in position with respect to all three axes, while the latching protuberance 226 may be fixed in position with respect to two of the three axes. Also, alternatively, both the latching protuberances 224 and 226 may be secured in position with respect to all three axes.

Additionally, bracing supports 223 and 225 may extend from the outboard structure 202. The bracing supports 223 and 225 may be perpendicularly oriented with respect to one another. The bracing supports 223 and 225 may be used to secure to the header assembly 100 and accommodate and cushion motion and bending forces during flight, and account for misalignment. Alternatively, the bracing supports 223 and 225 may not be used.

Figure 8:
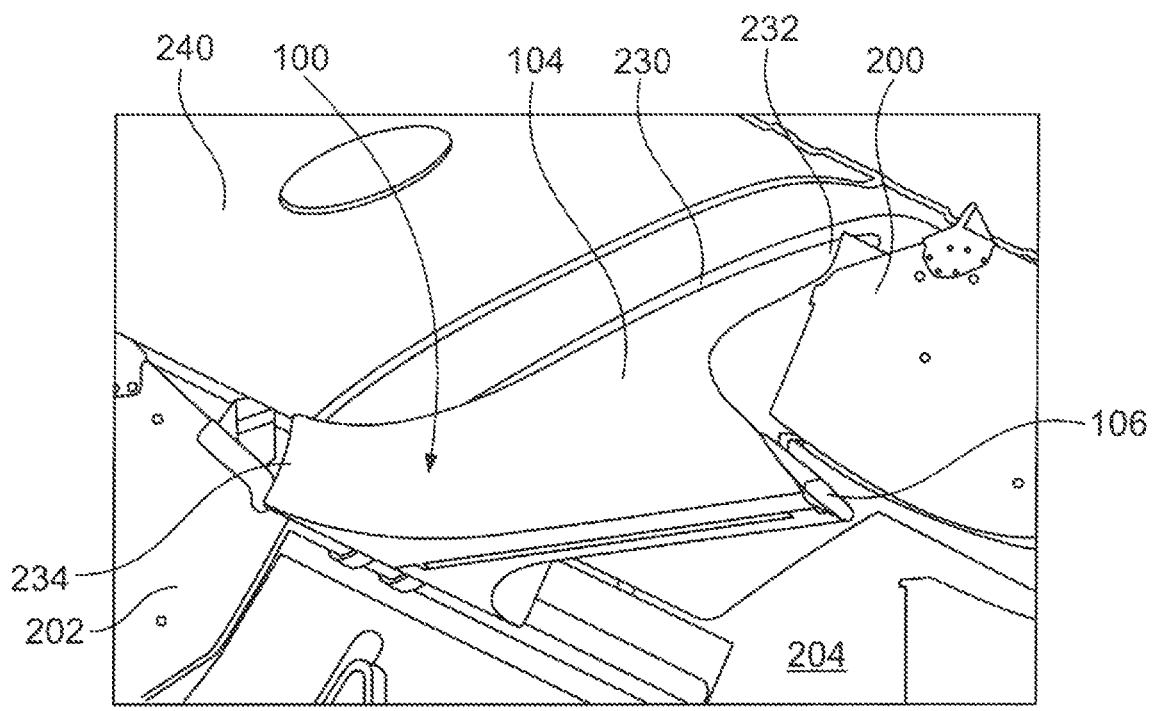
FIG. 8 is a diagrammatic representation of a perspective bottom view of a header assembly secured between an inboard structure and an outboard structure within an internal cabin of an aircraft, according to an embodiment of the present disclosure.

FIG. 8 is a diagrammatic representation of a perspective bottom view of the header assembly 100 secured between an inboard structure 200 and the outboard structure 202 within the internal cabin 204 of an aircraft, according to an embodiment of the present disclosure. One or more sealing members may connect to, or otherwise interface with, the header assembly 100 and provide a light-sealing interface between the header assembly 100 and structures within the internal cabin 204. For example, an upper longitudinal seal 230 may be sandwiched between internal surfaces of the first and second panels 104 and 106. The upper longitudinal seal 230 may extend from an inboard end 232 to an outboard end 234 of the header assembly 100. The upper longitudinal seal 230 may be part of the header assembly 100, or may be secured to a ceiling 240 of the internal cabin 204 and located between the first and second panels 104 and 106. In this manner, the upper longitudinal seal 230 may provide a mohawk seal, with the upwardly extending seal extending between and above the first and second panels 104 and 106 and up to the ceiling 240.

Figure 9:
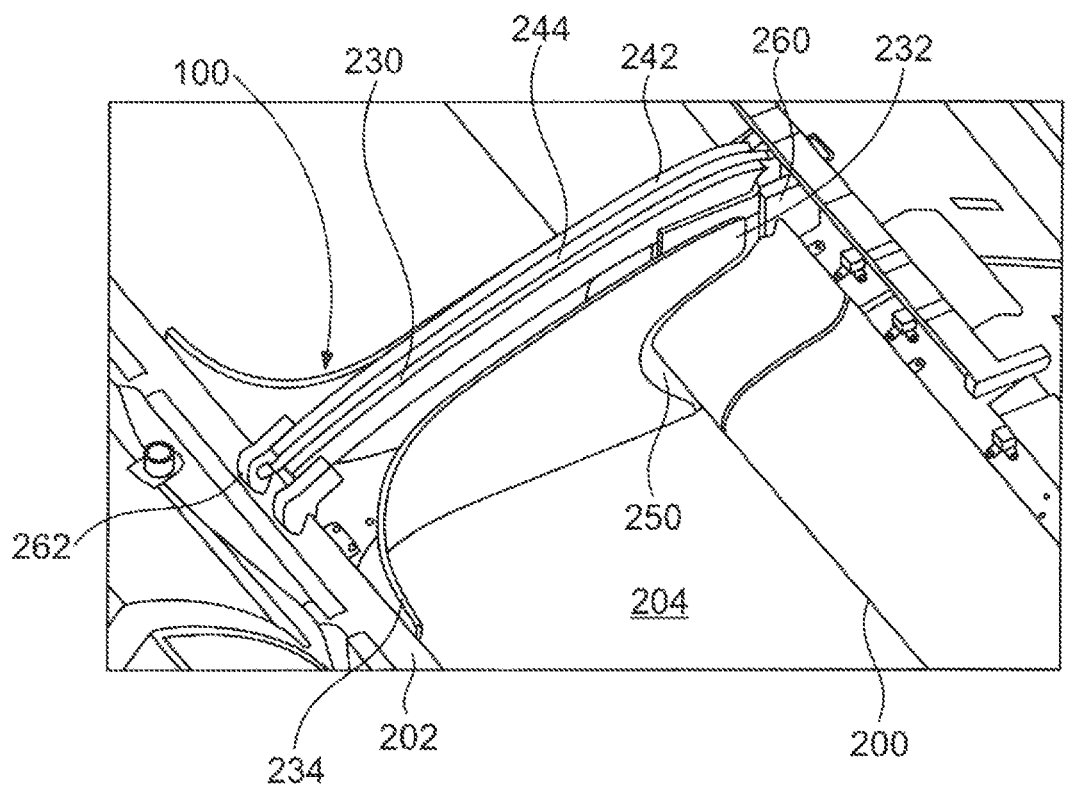
FIG. 9 is a diagrammatic representation of a perspective top view of a header assembly secured between an inboard structure and an outboard structure within an internal cabin of an aircraft, according to an embodiment of the present disclosure.
Figure 10:
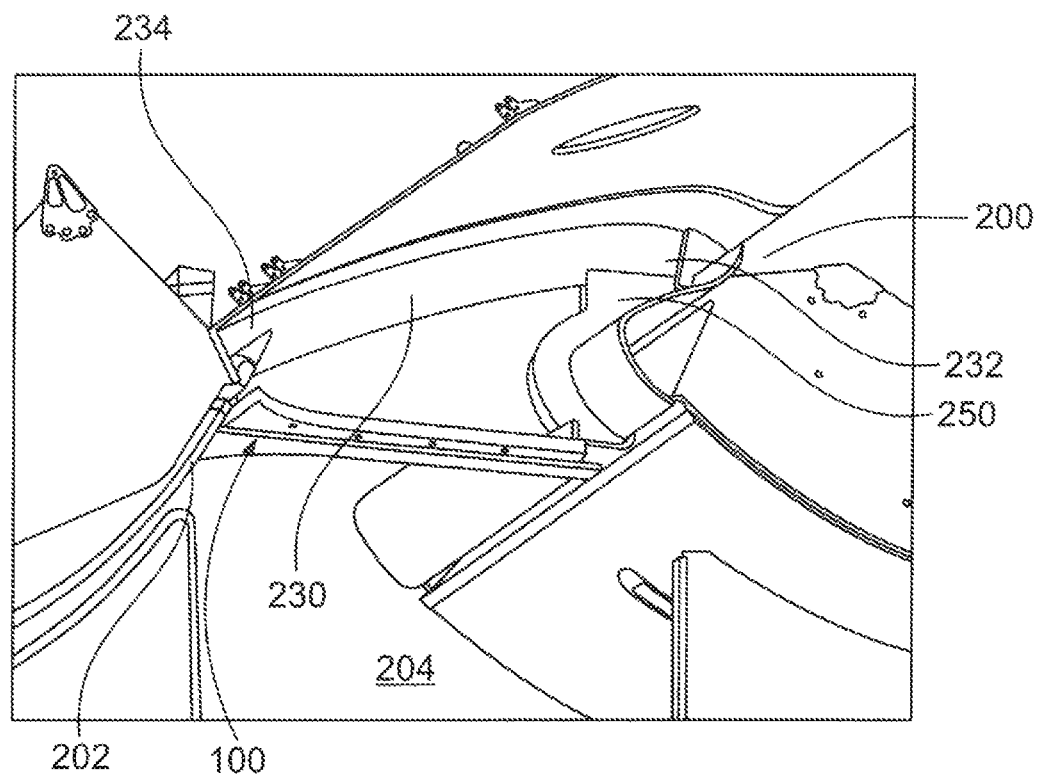
FIG. 10 is a diagrammatic representation of a perspective front internal view of a header assembly towards an inboard structure within an internal cabin of an aircraft, according to an embodiment of the present disclosure.
Figure 11:
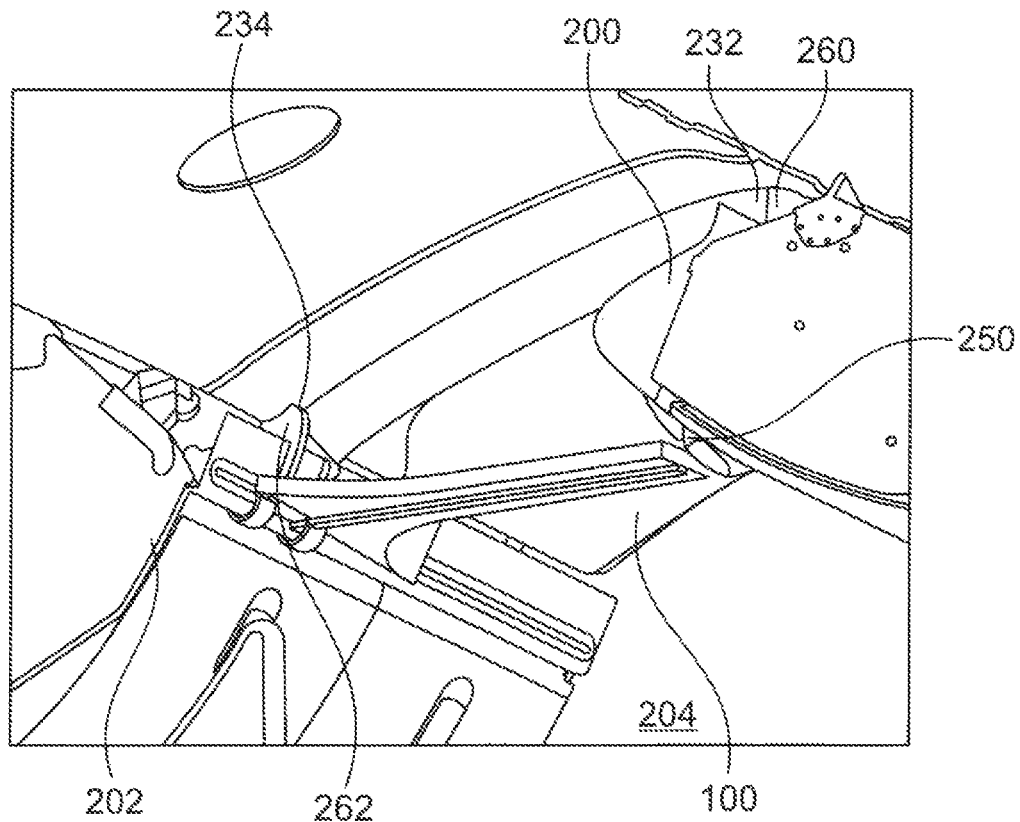
FIG. 11 is a diagrammatic representation of a perspective front internal view of a header assembly towards an outboard structure within an internal cabin of an aircraft, according to an embodiment of the present disclosure.

FIG. 9 is a diagrammatic representation of a perspective top view of the header assembly 100 secured between the inboard structure 200 and the outboard structure 202 within the internal cabin 204 of an aircraft, according to an embodiment of the present disclosure. FIG. 10 illustrates a perspective front internal view of the header assembly 100 towards the inboard structure 200 within the internal cabin 204. FIG. 11 illustrates a perspective front internal view of the header assembly 100 towards the outboard structure 202 within the internal cabin 204. Referring to FIGS. 9-11, the upper longitudinal seal 230 may extend from the first end 232 to the second end 234. A top surface 242 of the upper longitudinal seal 230 may connect to a connection interface 244 that securely suspends the upper longitudinal seal 230 from the ceiling 240 (shown in FIG. 8). For example, the connection interface 244 may be a separable interface, such as a clipped or Velcro interface, that allows the upper longitudinal seal 230 to be selectively secured and removed from the ceiling 240.

An inboard nose seal 250 may also extend from the first end 232 of the header assembly 100 and sealingly connects to an outer surface of the inboard structure 200. The inboard structure 200 may also include an inboard valance seal 260 that sealingly engages one or both of the upper longitudinal seal 230 and/or the inboard nose seal 250. Similarly, the outboard structure 202 may include an outboard valance seal 262 that sealingly engages the upper longitudinal seal 230. As shown, the inboard nose seal 250 and the upper longitudinal seal 230 may be separate and distinct seals. Alternatively, the upper longitudinal seal 230 and the inboard nose seal 250 may be integrally formed and molded as a single seal.

Each of the seals 230, 250, 260, and 262 may be formed of a non-porous foam (although they may be formed of other materials). Accordingly, the seals 230, 250, 260, and 262 provide light-limiting sealing interfaces between the header assembly 100 and the structures within the internal cabin 204 of the aircraft.

Figure 12:
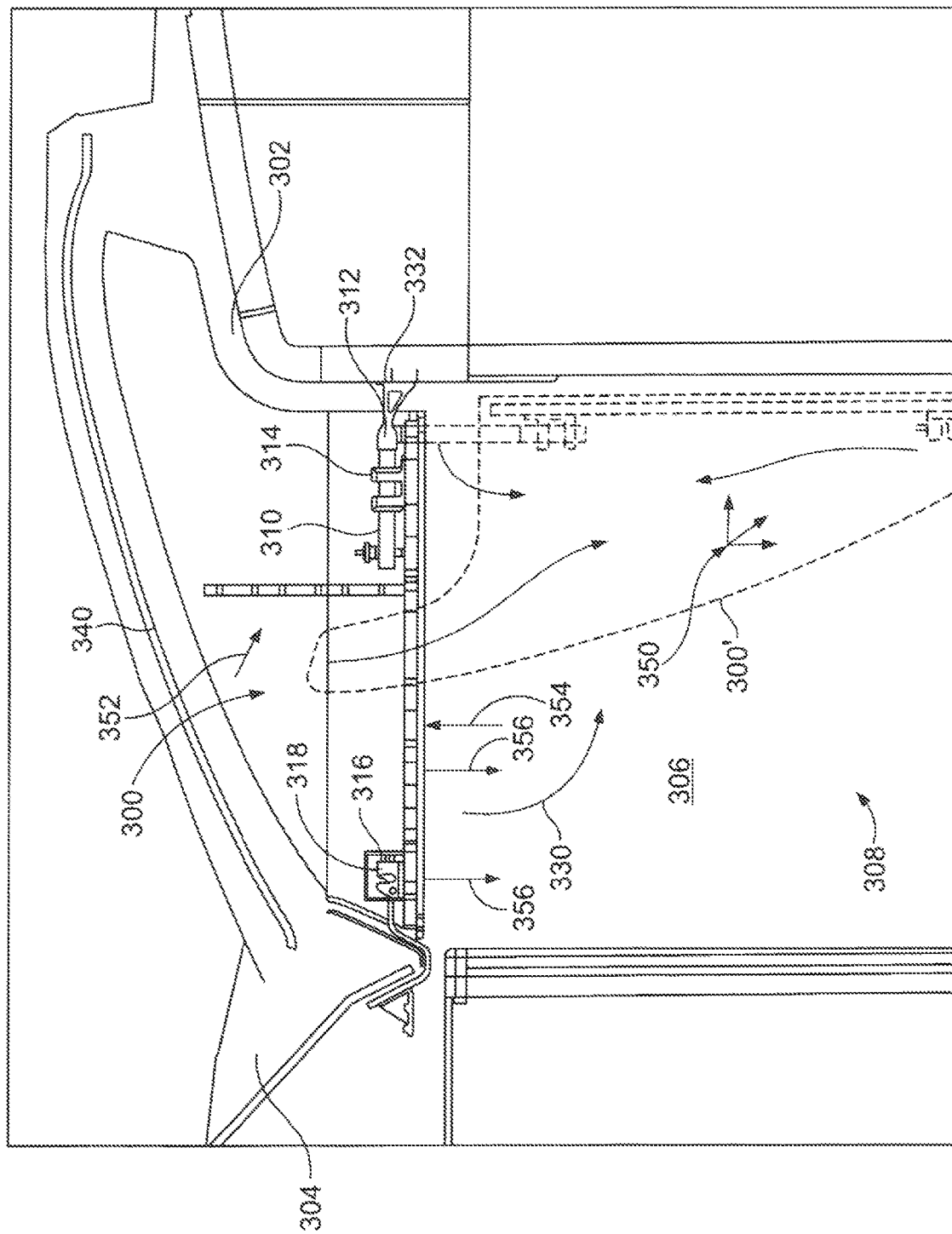
FIG. 12 is a diagrammatic representation of a front internal view of a header assembly secured to an inboard structure and an outboard structure and pivoted into a service position within an internal cabin of an aircraft, according to an embodiment of the present disclosure.

FIG. 12 is a diagrammatic representation of a front internal view of a header assembly 300 secured to an inboard structure 302 and an outboard structure 304 and pivoted into a service position 300' within an internal cabin 306 of an aircraft, according to an embodiment of the present disclosure. As shown, in the secured position, the header assembly 300 spans between the inboard and outboard structures 302 and 304 over an aisle 308 within the internal cabin 306. As shown, a hinged bayonet 310 of a connection fastener 312 is retained within an inboard support fitting 314 of the header assembly 300. The header assembly 300 may include two latches 316 that latchably retain latchable members, such as rods 318, extending from the outboard structure 304. Alternatively, the header assembly 300 may include the rods and the outboard structure 304 may include the latches.

In order to move the header assembly 300 into the service position 300', the latches 316 are manipulated to disengage from the rods 318. After the latches 316 disengage from the rods 318, the header assembly 300 may be pivoted downwardly in the direction of arc 330 about a pivot rod 332 of the connection fastener 312. As such, a technician may gain access to a ceiling 340, while the header assembly 300 hangs downwardly in the aisle 308 in a vertical orientation. Thus, components within the ceiling 340 may be serviced without the header assembly 300 being completely removed from the inboard structure 302.

Alternatively, the header assembly 300 may be configured to pivotally secure to the outboard structure 304 and disconnect from the inboard structure 302. In such an embodiment, the pin and grommet fastener assembly may be secured to the outboard structure 304, while the inboard structure 302 may include latches or structures that are configured to be latchably retained.

Referring to the embodiment shown in FIG. 12, in the secured position, the three anchoring locations between the header assembly 300 and the inboard and outboard structures 302 and 304 prevents the header assembly 300 from dislodging due to inertial forces 350 of the header assembly 300, lateral decompression forces 352 exerted into lateral portions of the header assembly 300, vertical decompression forces 354 exerted into the header assembly 300, and pulling forces 356 exerted into the header assembly 300. As such, the multiple anchoring locations provide a header assembly 300 that securely, safely, and robustly secures between the inboard and outboard structures 302 and 304.

Alternatively, the header assembly 300 may be configured to pivotally secure to the outboard structure 304 and disconnect from the inboard structure 302. In such an embodiment, the pin and grommet fastener assembly may be secured to the outboard structure 304, while the inboard structure 302 may include latches or structures that are configured to be latchably retained.

Figure 13:
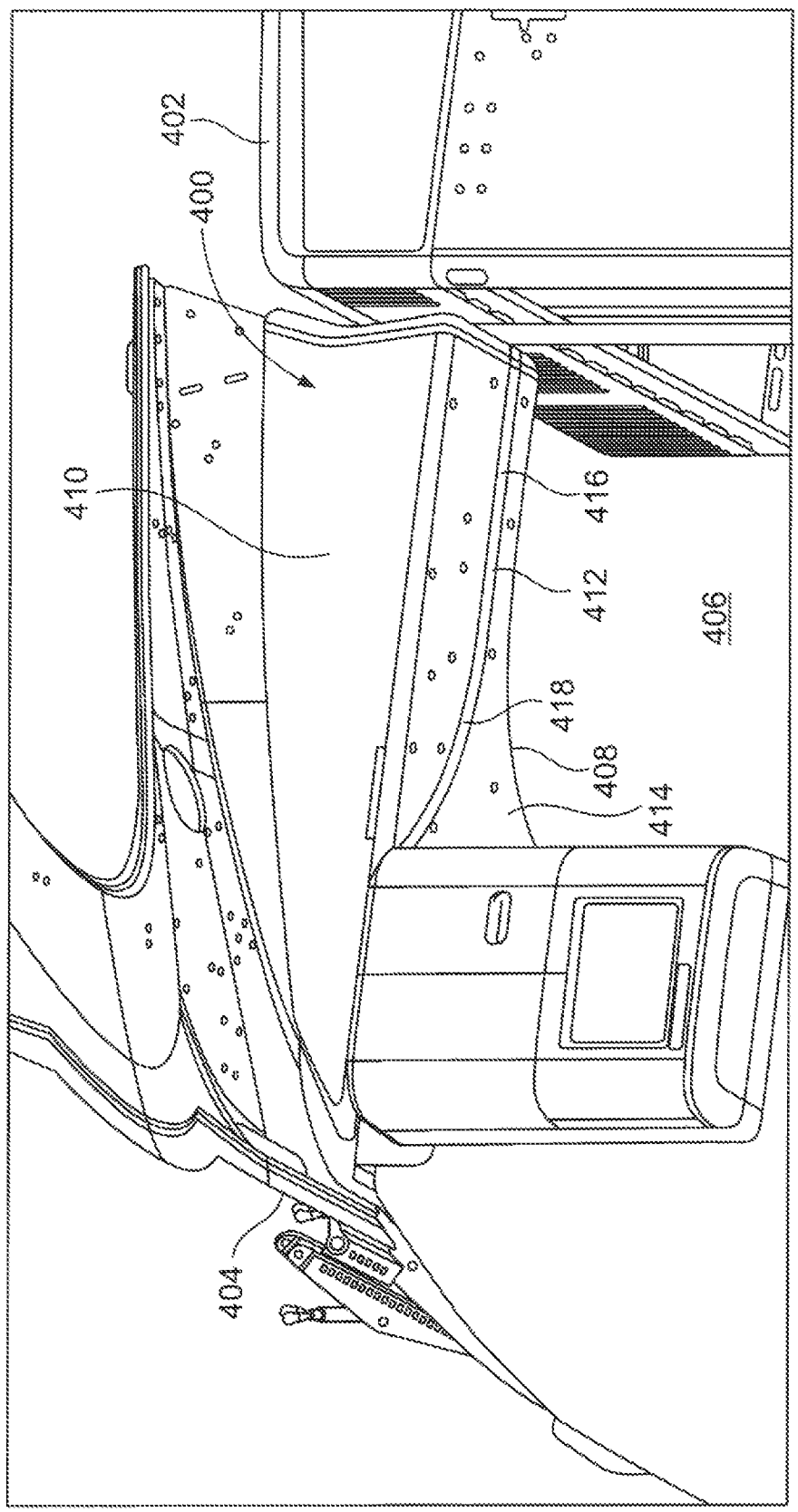
FIG. 13 is a diagrammatic representation of a perspective bottom view of a header assembly secured to an inboard structure and an outboard structure within an internal cabin of an aircraft, according to an embodiment of the present disclosure.

FIG. 13 is a diagrammatic representation of a perspective bottom view of a header assembly 400 secured to an inboard structure 402 and an outboard structure 404 within an internal cabin 406 of an aircraft, according to an embodiment of the present disclosure. The header assembly 400 is similar to those described above. The header assembly 400 may include a curved rear panel 408 and a flat front panel 410. Alternatively, the orientation may be reversed, such that the panel 408 is the front panel, and the panel 410 is the rear panel. A track channel 412 may be formed through a base panel 414. The track channel 412 may include a straight segment 416 connected to a curved segment 418. The track channel 412 is configured to receive and retain a curtain track channel, which movably retains connectors of a curtain.

The track channel 412 may be sized and shaped differently than shown, based on the size and shape of the curtain track (see FIG. 1). For example, the track channel 412 may be straight, c-shaped, or the like. Any of the embodiments of the present disclosure may include track channels such as shown and described with respect to FIG. 13.

Figure 14:
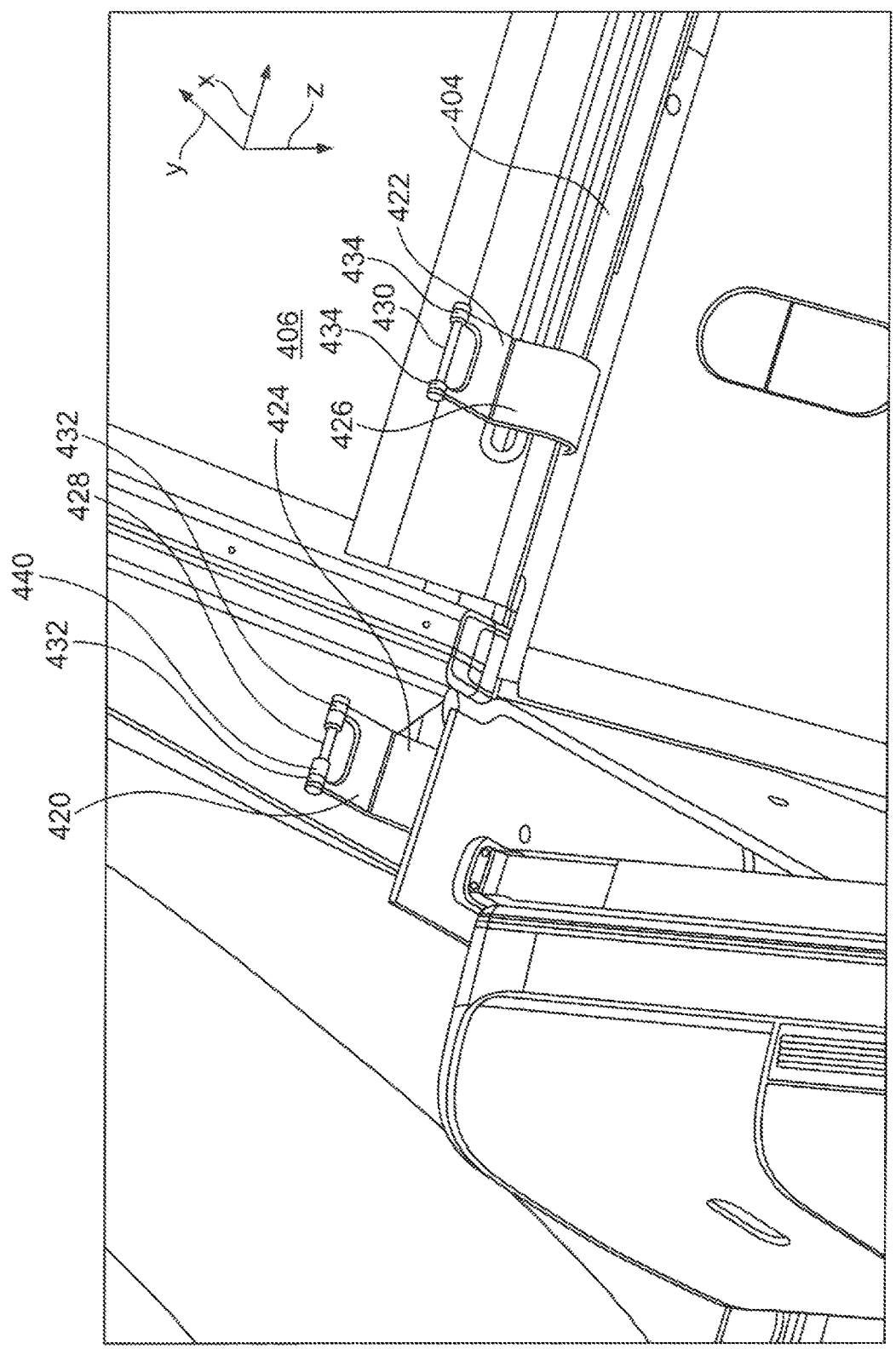
FIG. 14 is a diagrammatic representation of a perspective bottom view of support fittings connected to a portion of an outboard structure within an internal cabin of an aircraft, according to an embodiment of the present disclosure.

FIG. 14 is a diagrammatic representation of a perspective bottom view of support fittings 420 and 422 (or latchable members) connected to a portion of the outboard structure 404 within the internal cabin 406 of an aircraft, according to an embodiment of the present disclosure. The support fittings 420 and 422 are configured to be latchably engaged by latches of the header assembly 400 (shown in FIG. 13). Alternatively, the header assembly 400 may include the support fittings 420 and 422, while the latches extend from the outboard structure 404.

Each support fitting 420 and 422 may include an extension beam 424 and 426 and a latching bar 428 and 430 between prongs 432 and 434. The support fitting 420 may include motion-limiting sleeves 440 on either end of the latching bar 428. The motion-limiting sleeves 440 limit or prevent movement of the support fitting 420 in relation to a reciprocal latch in directions that are parallel with the longitudinal axis of the latching bar 428. While the support fitting 422 limits or otherwise prevents movement of an attached latch in directions that are parallel to axes Y and Z, the support fitting 422 may allow a limited range of motion in directions parallel to axis X. However, the motion-limiting sleeves 440 limit or otherwise prevent motion in directions parallel to axis X. Alternatively, both support fittings 420 and 422 may include motion-limiting sleeves. Also, alternatively, neither support fitting 420 and 422 may include motion-limiting sleeves.

Figure 15:
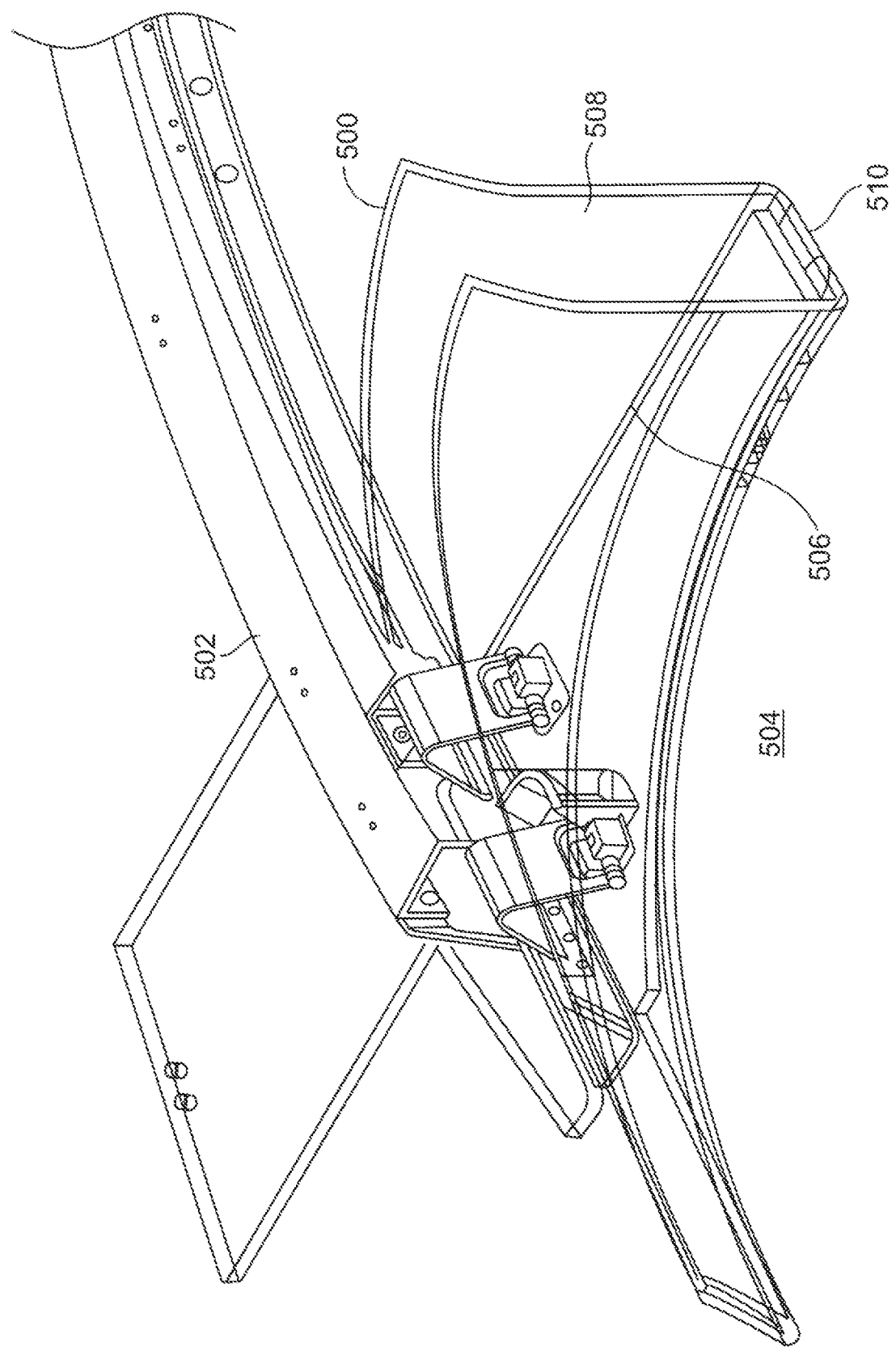
FIG. 15 is a diagrammatic representation of a perspective top view of a header assembly secured to an outboard structure within an internal cabin of an aircraft, according to an embodiment of the present disclosure.

FIG. 15 is a diagrammatic representation of a perspective top view of a header assembly 500 secured to an outboard structure 502 within an internal cabin 504 of an aircraft, according to an embodiment of the present disclosure. An inboard structure is not shown in FIG. 15. The header assembly 500 may be a light ring header assembly 500 in which an outboard interface is along an arc on a horizontal plane. The header assembly 500 may include front and rear panels 506 and 508 connected to a base panel 510. The front and rear panels 506 and 508 may be outwardly curved. Optionally, one of the front panel 506 or the rear panel 508 may be flat.

Figure 16:
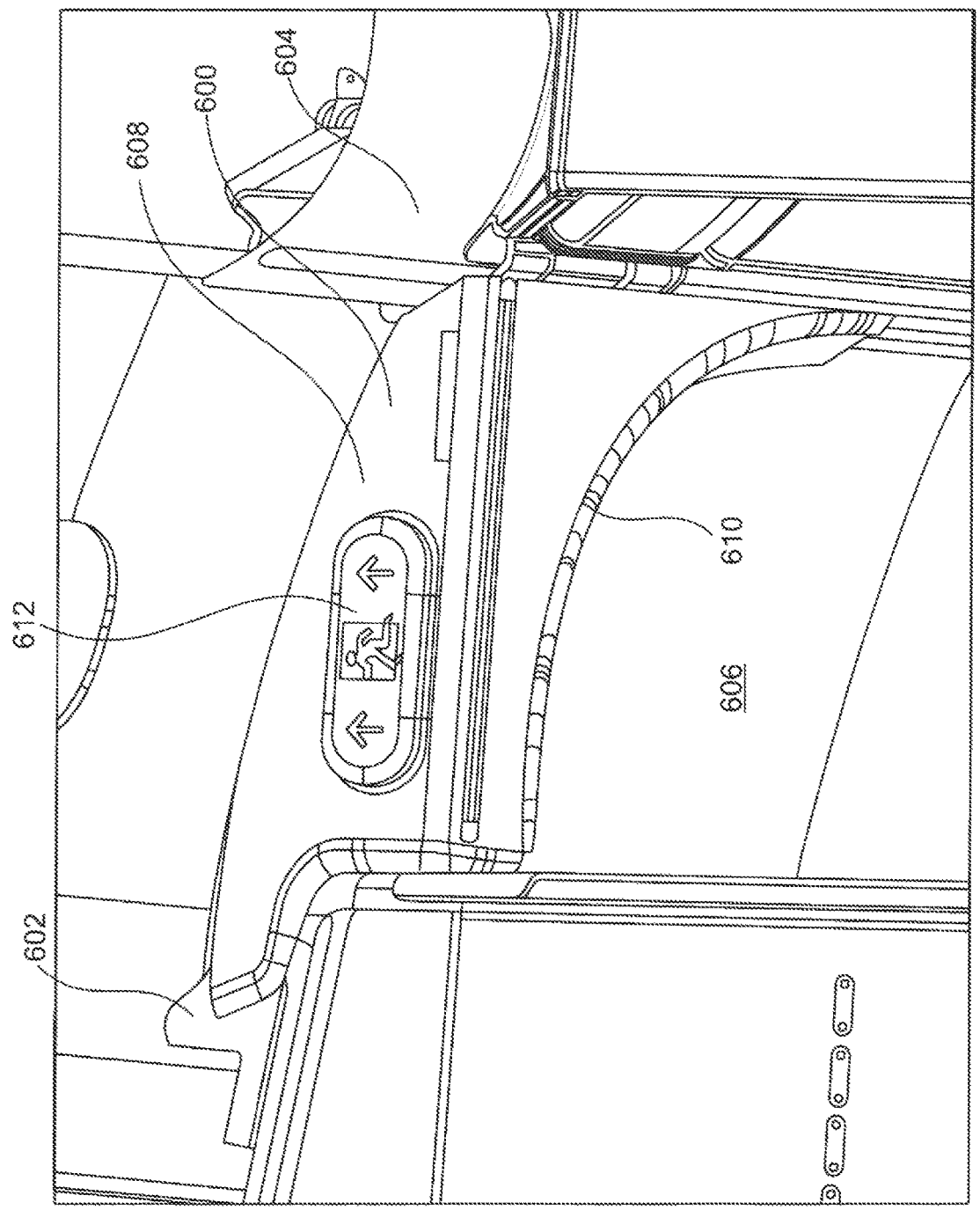
FIG. 16 is a diagrammatic representation of a perspective bottom view of a header assembly secured between an inboard structure and an outboard structure within an internal cabin of an aircraft, according to an embodiment of the present disclosure.

FIG. 16 is a diagrammatic representation of a perspective bottom view of a header assembly 600 secured between an inboard structure 602 and an outboard structure 604 within an internal cabin 606 of an aircraft, according to an embodiment of the present disclosure. A rear panel 608 may have a flat, planar surface, while a front panel 610 may include an outwardly-curved surface. A sign 612, such as an exit sign, may be secured or formed on the rear panel 608. Any of the embodiments described in the present application may include a sign on an exterior surface.

Referring to FIGS. 1-16, the header assemblies may be of various shapes, sizes, and configurations, and include one or more outer contours that curve or otherwise connect to structures in a smooth transitioning manner that blends the header assembly to or with one or more structures within an internal cabin. The multiple anchoring locations of the header assembly provide a robust, safe, and secure connection to the inboard and outboard structures within the internal cabin. For example, three anchoring locations provide secure anchoring connections at three separate and distinct positions (such as at points along three separate and distinct vertical planes). The pin-and-grommet connection between the header assembly and an internal structure eliminates, minimizes, or otherwise reduces shared forces. The header assemblies and seals serve to block, prevent, or otherwise limit light transmission therethrough, while allowing easy removal from a ceiling, so as to allow for quick and easy crown maintenance.

Embodiments of the present disclosure provide header assemblies that may include one or more curved swept panels that are configured to complement an interior architecture within an internal cabin of an aircraft. Various types of header assemblies may be used and adapted to particular locations within the internal cabin. The three point attachment (for example, the three anchoring locations) of the header assembly withstands decompression and inertial loads.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable persons skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A header assembly configured to be secured between an inboard structure and an outboard structure within an internal cabin of an aircraft, the header assembly comprising:

a main body including a first panel connected to an opposed second panel by a base panel, wherein the main body is configured to limit light from passing therethrough;

an extension beam secured to the main body; and at least three separate and distinct anchoring members that are configured to securely connect the main body to at least three separate and distinct reciprocal structures of the inboard and outboard structures, wherein the at least three anchoring members comprise:

a first anchoring member including a flat securing base secured to an upper surface of the extension beam proximate to a first edge of the extension beam, and a bracket extending upwardly from the securing base, wherein the bracket includes an internal channel;

a second anchoring member secured to the upper surface of the extension beam proximate to a second edge of the extension beam, wherein the second edge is opposite from the first edge, wherein the second anchoring member is configured to couple to a first latch; and a third anchoring member secured to the upper surface of the extension beam proximate to the second edge, wherein the third anchoring member is configured to couple to a second latch, wherein the first anchoring member, the second anchoring member, and the third anchoring member provide a triangular securing configuration within a securing plane that is parallel to a plane in which the upper surface of the extension beam resides.

2. The header assembly of claim 1, wherein the main body includes an inboard end configured to connect to the inboard structure and an outboard end configured to connect to the outboard structure, wherein the second and third anchoring members are proximate to the outboard end and the first anchoring member is proximate to the inboard end.

3. The header assembly of claim 1, wherein the base panel comprises a track channel configured to receive and retain a curtain track.

4. The header assembly of claim 1, wherein the main body is formed of a solid, non-porous composite material.

5. The header assembly of claim 1, wherein a space is formed between the first and second panels, and wherein at least one seal is positioned within the space between the first and second panels, wherein the at least one seal is configured to sealingly connect to an internal surface of the internal cabin of the aircraft.

6. The header assembly of claim 1, wherein one or both of the first and second panels includes an outwardly-curved surface.

7. The header assembly of claim 1, wherein the main body is symmetrical about a central longitudinal plane.

8. The header assembly of claim 1, wherein the first anchoring member is an inboard support fitting, wherein the second anchoring member is a first outboard support fitting, and wherein the third anchoring member is a second outboard support fitting.

9. The header assembly of claim 8, wherein an inboard one of the at least three reciprocal structures comprises a connection fastener extending from the inboard structure, wherein the internal channel is configured to receive and retain a bayonet of the connection fastener extending from the inboard structure.

10. The header assembly of claim 1, wherein the main body is configured to be moved between a secured position between the inboard and outboard structures and a downward pivoted position in which the main body is downwardly pivotally secured to one of the inboard or outboard structure and disconnected from the other of the inboard or outboard structures.

11. The header assembly of claim 1, wherein an insert is secured within the internal channel of the first anchoring member, wherein the insert is configured to reduce rattling of a reciprocal connecting bayonet.

12. An aircraft assembly comprising:
a fuselage defining an internal cabin;
an inboard structure and an outboard structure separated by an aisle within the internal cabin; and
a header assembly secured between the inboard structure and the outboard structure, wherein the header assembly is positioned above a moveable curtain assembly, the header assembly comprising:
   a main body formed of a solid, non-porous composite material, wherein the main body comprises a first panel connected to an opposed second panel by a base panel, wherein the main body is configured to limit light from passing therethrough;
   an extension beam secured to the main body; and
   at least three separate and distinct anchoring members that are configured to securely connect the main body to at least three separate and distinct reciprocal structures of the inboard and outboard structures, wherein the at least three anchoring members comprise:
      a first anchoring member including a flat securing base secured to an upper surface of the extension beam proximate to a first edge of the extension beam, and a bracket extending upwardly from the securing base, wherein the bracket includes an internal channel;
      a second anchoring member secured to the upper surface of the extension beam proximate to a second edge of the extension beam, wherein the second edge is opposite from the first edge, wherein the second anchoring member is configured to couple to a first latch; and
      a third anchoring member secured to the upper surface of the extension beam proximate to the second edge, wherein the third anchoring member is configured to couple to a second latch,
      wherein the first anchoring member, the second anchoring member, and the third anchoring member provide a triangular securing configuration within a securing plane that is parallel to a plane in which the upper surface of the extension beam resides.

13. The aircraft assembly of claim 12, wherein the main body includes an inboard end that connects to the inboard structure and an outboard end that connects to the outboard structure, wherein the second and third anchoring members are proximate to the outboard end and the first anchoring member proximate to the inboard end.

14. The aircraft assembly of claim 12, further comprising a curtain track, wherein the base panel comprises a track channel that retains the curtain track that connects to the moveable curtain assembly.

15. The aircraft assembly of claim 12, wherein a space is formed between the first and second panels, and wherein at least one seal is secured within the space between the first and second panels, wherein the at least one seal sealingly connects to an internal surface of the internal cabin of the aircraft.

16. The aircraft assembly of claim 12, wherein one or both of the first and second panels includes an outwardly-curved surface.

17. The aircraft assembly of claim 12, wherein the first anchoring member is inboard support fitting, wherein the second anchoring member is a first outboard support fitting, wherein the third anchoring member is a second outboard support fitting, wherein an inboard one of the at least three reciprocal structures comprises a connection fastener extending from the inboard structure, wherein the retains a bayonet of the connection fastener extending from the inboard structure.

18. The aircraft assembly of claim 12, wherein the main body is movable between a secured position between the inboard and outboard structures and a downward pivoted position in which the main body is downwardly pivotally secured to one of the inboard or outboard structure and disconnected from the other of the inboard or outboard structures.

19. The aircraft assembly of claim 12, wherein the outboard structure comprises one of a first overhead storage bin, a partition wall, a galley, or a lavatory, and wherein the inboard structure comprises one or more of a second overhead storage bin, a partition wall, a galley, or a lavatory.

20. A header assembly configured to be secured between an inboard structure and an outboard structure within an internal cabin of an aircraft, the header assembly comprising:
a main body formed of a solid, opaque, non-porous composite material, wherein the main body is configured to limit light from passing therethrough, wherein the main body comprises a first panel connected to an opposed second panel by a base panel, an inboard end configured to connect to the inboard structure, and an outboard end configured to connect to the outboard structure, wherein the base panel comprises a track channel configured to receive and retain a curtain track, wherein a space is formed between the first and second panels, wherein the main body is configured to be moved between a secured position between the inboard and outboard structures and a downward pivoted position in which the main body is downwardly pivotally secured to one of the inboard or outboard structure and disconnected from the other of the inboard or outboard structures;
at least one seal secured within the space between the first and second panels, wherein the at least one seal is configured to sealingly connect to an internal surface of the internal cabin of the aircraft;
an extension beam secured to the main body; and
at least three separate and distinct anchoring members secured to the extension beam, wherein the at least three anchoring members are configured to securely connect the main body to at least three separate and distinct reciprocal structures of the inboard and outboard structures, wherein the at least three anchoring members comprise:
   a first anchoring member proximate to the inboard end, wherein the first anchoring member includes a flat securing base secured to an upper surface of the extension beam proximate to a first edge of the extension beam, and a bracket extending upwardly from the securing base, wherein the bracket includes an internal channel;
   a second anchoring member proximate to the outboard end, wherein the second anchoring member is secured to the upper surface of the extension beam proximate to a second edge of the extension beam, wherein the second edge is opposite from the first edge, wherein the second anchoring member is configured to couple to a first latch; and a third anchoring member proximate to the outboard end, wherein the third anchoring member is secured to the timer surface of the extension beam proximate to the second edge, wherein the third anchoring member is configured to couple to a second latch, wherein the first anchoring member, the second anchoring member, and the third anchoring member provide a triangular securing configuration within a securing plane that is parallel to a plane in which the upper surface of the extension beam resides. wherein an inboard one of the at least three reciprocal structures comprises a connection fastener extending from the inboard structure, and wherein the internal channel is configured to receive and retain a bayonet of the connection fastener extending from the inboard structure.

* * * * *